Sept. 19, 1933.  E. W. MILLER  1,927,098
MACHINE FOR FORMING INTERNAL CLUTCH ELEMENTS
Filed Feb. 25, 1928   5 Sheets-Sheet 2

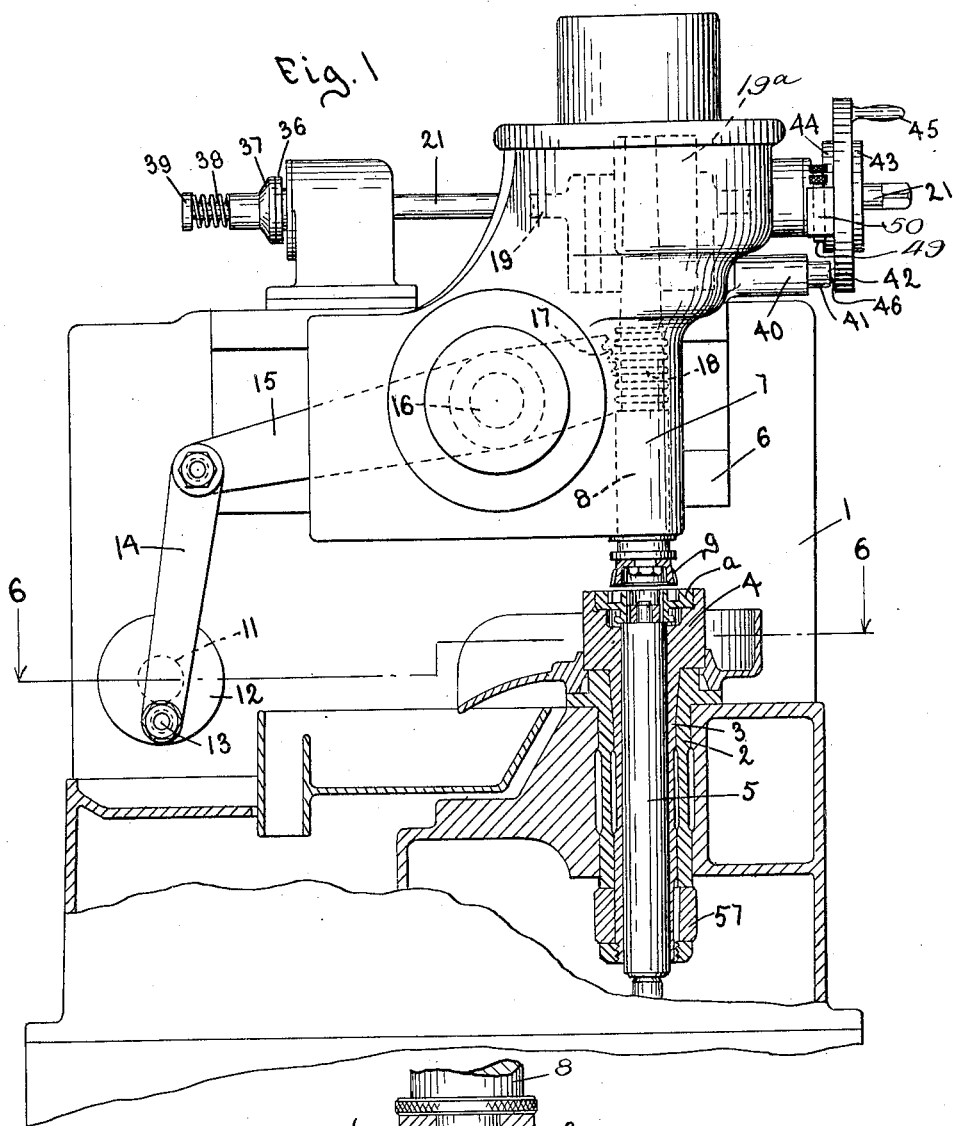
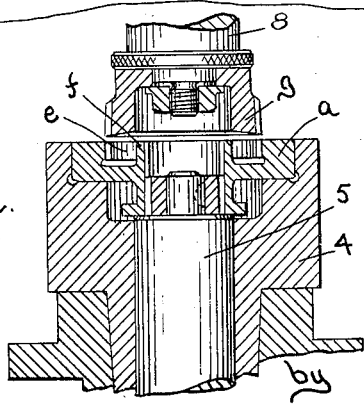

INVENTOR
Edward W. Miller

INVENTOR
Edward W Miller

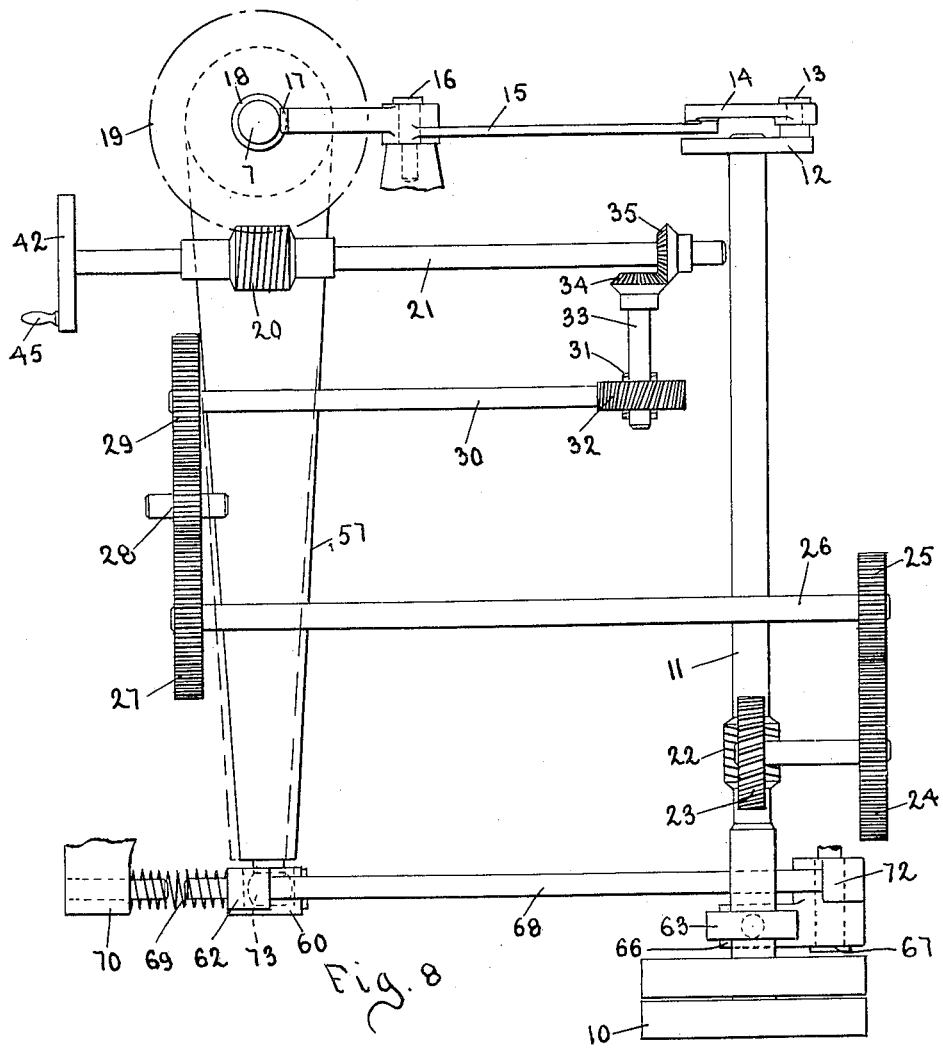
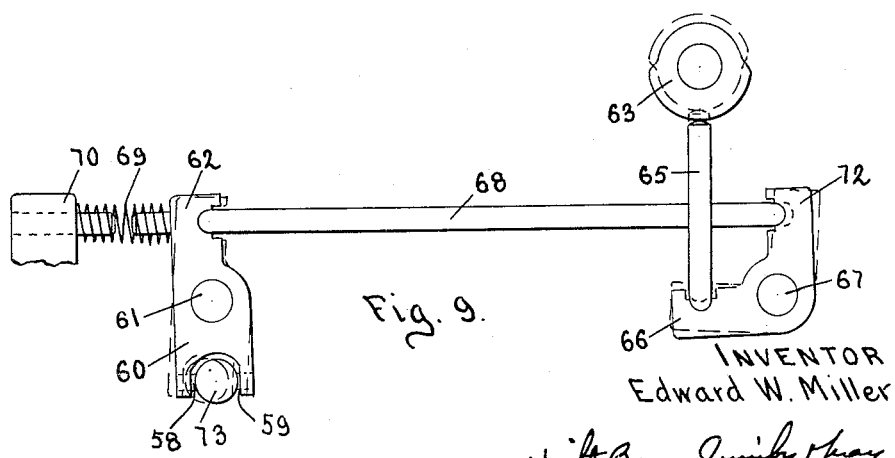

Sept. 19, 1933.  E. W. MILLER  1,927,098

MACHINE FOR FORMING INTERNAL CLUTCH ELEMENTS

Filed Feb. 25, 1928  5 Sheets-Sheet 5

INVENTOR
Edward W. Miller by Wright, Brown, Quinby & May
att'ys

Patented Sept. 19, 1933

1,927,098

UNITED STATES PATENT OFFICE 1,927,098

MACHINE FOR FORMING INTERNAL CLUTCH ELEMENTS

Edward W. Miller, Springfield, Vt., assignor to The Fellows Gear Shaper Company, Springfield, Vt., a corporation of Vermont Application February 25, 1928. Serial No. 257,068

29 Claims. (Cl. 90—8)

This invention relates to a method and machines for forming teeth in internal machine elements, including internal clutch members of the positive type, internal gears, and other machine elements of like or similar character. The term "clutch" as used in this specification includes couplings and the like of any design characterized by complemental members, one of which is adapted to pass within the other and has external projections or teeth coacting with internal teeth within the other member. The object of the invention is to provide means and a mode of action for rapidly and accurately forming the notches or recesses, and intermediate teeth, in such internal elements, making them accurately complemental to the external teeth or projections of the mating clutch member, in the case of a positive clutch or coupling, and conjugate to a mating external gear or pinion in the case of an internal gear. In carrying this object into effect I provide a tool in the nature of a planing cutter having teeth equal in number and circular pitch to the notches or spaces to be cut in the work piece (internal machine element) but of less angular width, and the side faces of which are counterparts of the forms to be cut, combined with means for effecting relative cutting travel between the tool and work piece and means for effecting a partial rotation between the cutter and work piece in opposite directions so as to shape first one side and then the other of the tooth receiving notches in the work piece.

It is a further and more particular object of the invention to form tooth receiving notches in an internal clutch member with faces of involute curvature to mate with projections in the form of involute gear teeth on the complemental external clutch element, because these forms can be generated in both the external clutch member and the cutter for forming the internal member, rapidly, economically, and with control of form and dimensions to the utmost accuracy. Accordingly in the embodiment of the invention herein disclosed for illustration I make use of a cutter having teeth with involute face curves, and in that respect similar to an external gear, but differing from standard involute gears in that its teeth are of less than standard width. I desire it to be understood, however, that the invention in its broader aspects is not limited to use or combination with a cutter of this specific character or to the production of articles having involute forms only; but that the fundamental principles of what I claim to be my invention may be applied to cutting other forms also which have the required counterpart or conjugate relationship to the complemental external machine element, whatever the form and dimensions of the projections and notches so produced may be. Accordingly the invention consists in a machine having mechanism for carrying a cutter and work piece of the character above explained, together with mechanism for effecting relative movements between the cutter and work piece, as previously set forth and hereinafter more fully described; and in the method of forming internal machine elements by so cutting them.

A preferred embodiment of the machine phase of the invention, and the steps of the method are shown in the drawings, in which—

Fig. 1 is in part a front elevation of the machine and in part a vertical section through the work spindle;

Fig. 2 is a sectional view on an enlarged scale of the work holder, work piece and cutter shown in Fig. 1;

Fig. 8 is a diagrammatic plan view of the driving mechanism;

Fig. 9 is an elevation of part of the work relieving mechanism;

Like reference characters designate the same parts wherever they occur in all the figures.

Figure 13:
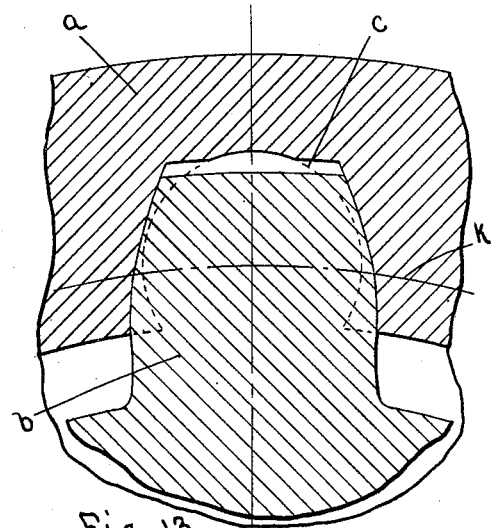
Fig. 13 is a similar view illustrating the coaction of the complemental members of a clutch.

The particular work piece chosen for illustration here is an internal clutch member of the type now generally used in automobile transmission mechanisms for coupling the transmission shaft to the engine in the direct or high speed drive. It is designated by the reference letter $a$. The engine driven complemental clutch member is formed as a part of the pinion which drives the counter shaft of the transmission, and has external clutch teeth (one being shown at $b$ in Fig. 13) which, in this illustration, are in the form of involute gear teeth and may be axial extensions of the pinion teeth. The purpose of the operation carried out by this machine in the illustration given is to shape the sides of the notches or spaces $c$, which receive the teeth $b$, with a form which is the complement and counterpart of the contacting sides of the teeth $b$. Preliminary to the forming of the notches $c$ in this manner, however, there are formed in the clutch member $a$ a circular series of holes, one of which is shown at $d$ in Figs. 10 and 11, the centers of which are spaced apart equal to the pitch of the external clutch teeth $b$, and the diameter of which is less than the width of the teeth. These holes may be drilled, or routed by an end milling tool in the solid disk from which the clutch member $a$ is made, and the disk is then counterbored concentrically at $e$ (Fig. 2) to cut a space into which the body of the external clutch member may enter. A hub $f$ may be formed at the same time, but is not essential. Equivalent recesses may be otherwise made, however.

The notches $c$ are finally shaped as required by a shaping cutter $g$ (Figs. 1, 2, 10, 11 and 12) having a series of teeth similar to those of the external clutch member, equal in number and with equal spacing thereto on a pitch circle of the same diameter as that of the clutch member, but having less width than the clutch teeth $b$ and extending further outward from the pitch circle. One of the cutter teeth is shown at $h$ in Figs. 10, 11 and 12. Its opposite faces $i$ and $j$ are involute curves generated to the same base circle as the face curves of the external clutch teeth. The curved line $k$ in Figs. 10-13 inclusive represents an arc of the pitch circle, of the same radius as to both the external clutch member and the cutter, on which the teeth of both are equally spaced apart. The cutter is centrally recessed to clear the hub $f$ of the work piece (Figs. 1 and 2) when such a hub is provided.

Figure 11:
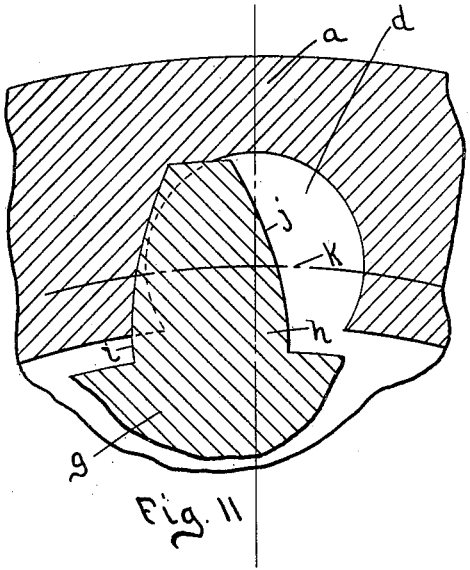

The intersections of the side faces $i$ and $j$, and the outer face $l$ of the cutter teeth, with the end face of the cutter form the cutting edges. The cutter is reciprocated axially in the manner of the tool of a shaping machine in order to cut the work. Or conversely, the work piece may be similarly reciprocated, as in a planer. At the same time a slow rotary motion is given to the cutter, or conversely to the work, giving an increment of lateral movement after each cutting stroke, first in one direction until each tooth has cut away the work beyond the boundary of the corresponding hole $d$ at one side, as shown in Fig. 11, forming a curved surface $m$ in the work piece, and then in the opposite direction beyond the boundary of the hole $d$ at the other side until the face $n$ is formed at a distance from the face $m$ equal to the width of the clutch tooth $b$, or enough wider than such tooth to permit easy engagement of the external clutch member with the internal member by an axial movement. Thus the notches in the internal member are formed with side faces which are exactly complemental to the overlapping faces of the external clutch teeth $b$, whereby engagement throughout the entire overlapping length of the complemental clutch members is effected.

It is to be understood that all of the clutch teeth and cutter teeth are the same as the one thus illustrated and described in detail, and that all the complemental notches in the internal clutch member are formed simultaneously by the simultaneous action of the several cutter teeth. A practically necessary condition is that the holes $d$ cut in the work piece preliminary to the operation of the shaping cutter open at their inner sides into the counterbored space $e$ of the work piece and extend outwardly beyond the extremities of the cutter teeth when the latter are in mid position, and that the cutter teeth be narrow enough to enter these holes prior to, or in the course of, the first cutting stroke. The holes are made circular because they are cut by drilling or routing, the quickest and most economical way of making them. The method of forming the cavity $e$ and recesses $d$ is not important to the essential invention, however, provided only that suitable spaces to admit the teeth of the cutter are formed in some manner.

Describing now the specific machine illustrated in the drawings for doing this work, it consists of a base or supporting structure 1 in which there is a bearing sleeve 2. In this bearing is mounted a quill 3 or hollow work spindle carrying a chuck 4 to receive the work piece, and in which is an inner spindle 5 for centering the work piece and ejecting it when completed. On a rising part of the machine frame is a guideway 6 by which is supported slidingly a saddle 7 containing a rotatable and reciprocatable cutter spindle 8 protruding from the lower end of the saddle and to the protruding end of which the cutter $g$ is secured. Said guideway constitutes means whereby the saddle may be moved to place the cutter spindle in alinement with the work spindle or aside therefrom so as to permit placement and removal of the work pieces. The saddle may be so moved by a thrust exerted manually against it lengthwise of the guideway, but is preferably shifted and locked by mechanism of any suitable character, such as that shown in the patent to Edwin R. Fellows, No. 1,436,806, August 7, 1923, for controlling the cutter-carrying slide 20 therein.

Power for driving the machine is delivered from any suitable source by a belt and pulley 10, or other suitable means, to a main shaft 11 which carries a crank disk 12 and crank pin 13, coupled by a connecting rod 14 to a lever 15 pivoted at 16 on the saddle 7. One arm of lever 15 extends to the cutter spindle and carries a gear segment 17 meshing with a series of circular rack teeth 18 surrounding the cutter spindle as shown by dotted lines in Fig 1. Thus with each revolution of the shaft 11 the cutter is given one up and down reciprocation.

The cutter is rotated at the same time by a worm wheel 19 (Fig. 1) through the engagement therewith of a non-circular slide 19a secured to cutter spindle 8, which transmits rotation while permitting endwise sliding movement of the spindle. Meshing with the worm wheel is a worm 20 (Fig. 3) keyed to a shaft 21 which is driven by the main shaft 11 through a gear train consisting of a worm 22 on the main shaft, a worm wheel 23, change gears 24, 25, connected respectively to said worm gear and to a shaft 26 (Figs. 3 and 8), change gears 27, 28 and 29, shaft 30, helical gears 31 and 32, shaft 33 and bevel gears 34, 35. The bevel gear 35 is loose on worm shaft 21 and transmits rotation thereto through a pair of friction disks 36 and 37, the former of which is connected to the gear 35 and the latter is splined on the shaft and pressed against the disk 36 by a spring 38 which reacts against a head 39 made fast on the shaft.

Figures 3, 4, 5:
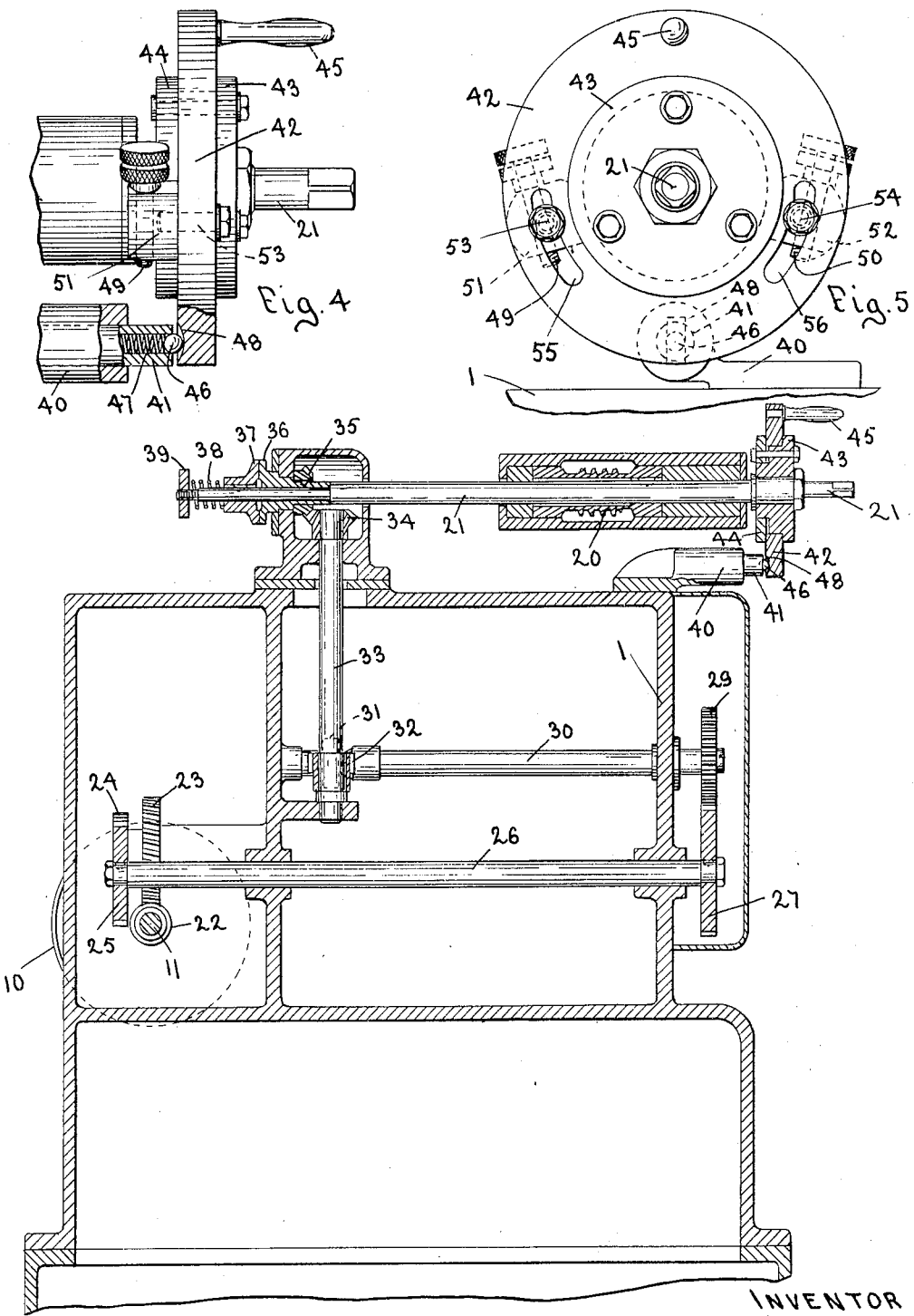
Fig. 3 is a vertical section in a plane which includes the mechanism for partially rotating the cutter.
Fig. 4 is a side elevation on a larger scale, partly shown in section, of the feed disk and stops by which the rotation of the cutter is controlled.
Fig. 5 is a front elevation of such feed disk and stops.
Figure 6:
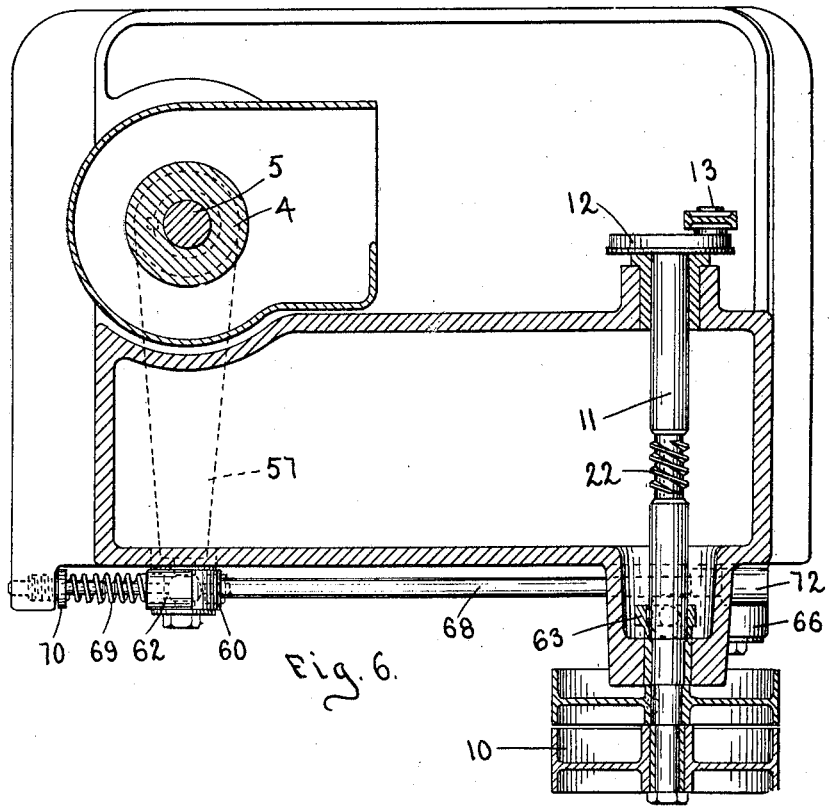
Fig. 6 is a horizontal section on line 6—6 of Fig. 1.
Figure 7:
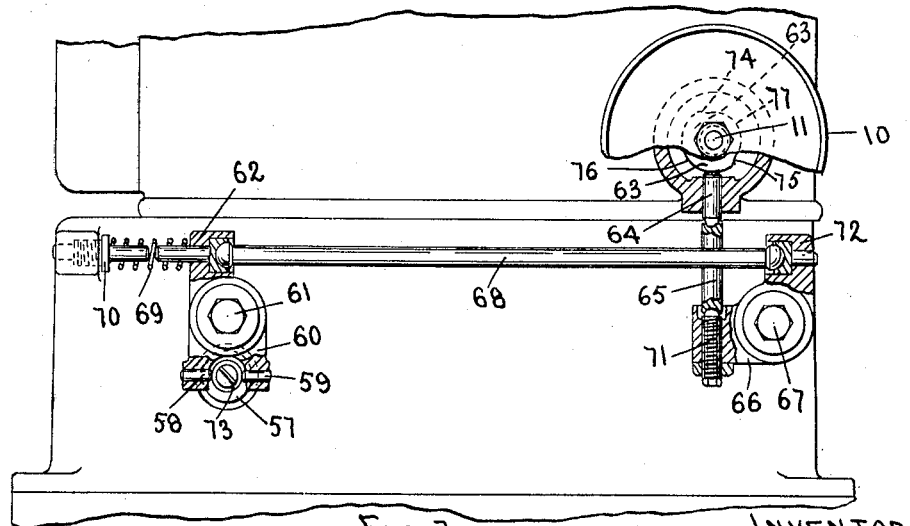
Fig. 7 is a partial rear elevation, and, in part, a vertical section, of the machine.
Figure 10:
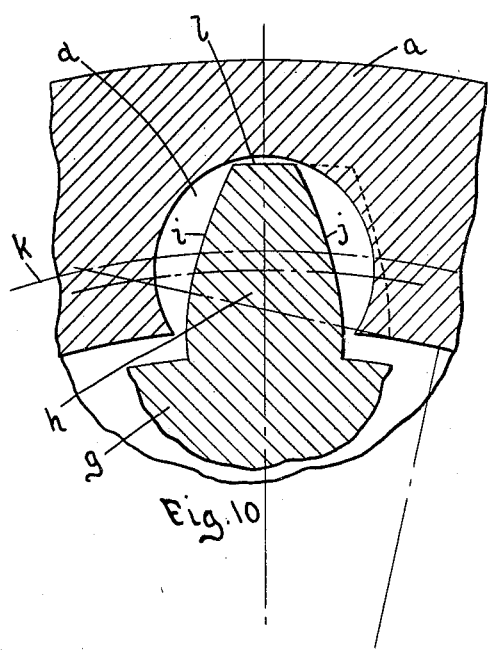
Figs. 10, 11 and 12 are fragmentary diagrammatic sectional views illustrating the action of the tool on the work.
Figure 12:
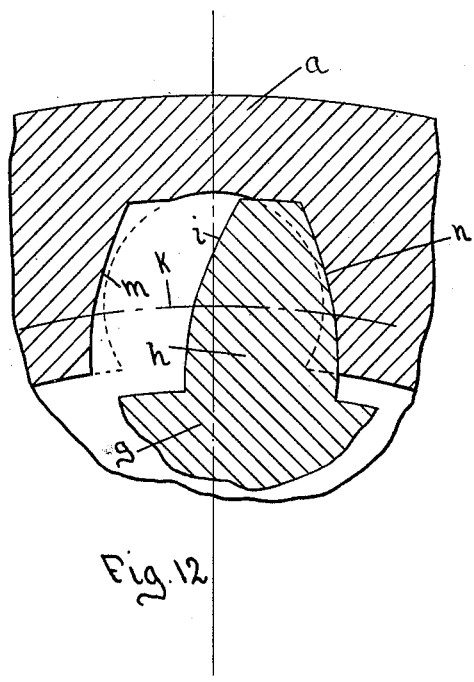

The rotation thus given to the cutter feeds it progressively at a slow rate while reciprocating many times, from the relation shown in Fig. 10 to that shown in Fig. 11, and then in the opposite direction to the relation shown in Fig. 12. It is limited by coacting stops respectively mounted on the machine frame and carried by the shaft 21. On the top of the machine frame is a bracket 40 in which is mounted one of said stops, a fixed stop 41. A disk 42 carrying the cooperating stops is rigidly made fast to the worm shaft 21, being clamped between the flange of a hub 43, which is keyed to the shaft, and a clamping plate 44, as shown in Fig. 3. The disk carries a handle 45 by which the shaft may be rotated. A detent 46 is mounted in the end of the stop 41 and pressed by a spring 47 against the adjacent side of the disk, in which is a shallow notch 48 to receive the detent when the cutter is in the neutral position shown in Fig. 10. Stops 49 and 50 are carried by the disk at opposite sides of the fixed stop 41 and, when arrested by the fixed stop, limit the rotation of the cutter in either direction. The friction disks 36 and 37, which transmit sufficient force to hold the cutter up to the work in operation, slip when the worm shaft is thus stopped.

The stops 49 and 50 are adjustable, being carried by blocks 51 and 52, respectively, secured to the disk by screws 53 and 54, which pass through slots 55 and 56 concentric with the disk. The stops are screws threaded through these blocks for fine and accurate adjustment. The extremities of the stop screws are the parts which engage the fixed stop and they are maintained at the correct distance from the center of the shaft by the blocks 51 and 52, which have concave faces bearing on the circumference of the clamp plate 44 whereby their rotation about the clamp screws 53 and 54 is prevented.

Adjustment of the stops is necessary, not only for the purpose of initially limiting the cutter travel to form notches of a predetermined width, but also to compensate for diminution in the width of the cutter teeth which occurs as the result of sharpening. The faces of the teeth are slightly inclined inward to give cutting clearance, and are sharpened by grinding away the end face in which the cutting edges lie. Hence the teeth become narrower after repeated sharpenings.

In order to avoid rubbing of the cutter on the work during the non-cutting or return strokes, the work piece is slightly rotated about its axis, (that is, about an axis lying within the circumference of the work piece and of the work holder, and extending in the same direction as the reciprocation of the cutter), after each cutting stroke, sufficiently to relieve it from the cutter, and is returned to previous position before the next cutting stroke. For thus moving or relieving the work, an arm 57 is secured and keyed to the work spindle and extends to the rear of the machine base, where its extremity is flanked and engaged by contact pieces 58 and 59 carried by the forked arm 60 of a lever pivoted on a stud 61. The second arm 62 of this lever is moved in one direction by a cam 63 on the main shaft 11, acting through rods 64, 65, a bell crank lever 66 pivoted to the base at 67, and a rod 68; and in the opposite direction by a spring 69 which presses the arm 62 against the end of rod 68 and reacts against an adjustable abutment 70 supported by the base. The rod 64 slides in a straight path in a fixed guideway. Rod 65 is an intermediate transmission rod which has ball and socket engagement with the slide 64 and with an adjustable abutment screw 71 in one arm of the bell crank lever 66; and the rod 68 has ball and socket engagement at opposite ends with the arm 72 of the bell crank lever and the arm 62 of lever 60. The end of the arm 57 which lies between the contact pieces 58 and 59 is equipped with a spherical roll 73. Thus the varying angularity of the different arms is compensated for with the utmost simplicity. The spring 69 exerts pressure constantly maintaining the transmission rods and levers in engagement with one another and the slide 64 in engagement with the cam, taking up all backlash and wear between these parts. As the cam 63 is on the same shaft with the crank which reciprocates the cutter, it turns in unison with such crank, and it is so timed that it moves the work piece angularly back and forth in the manner above described.

In the operation of the machine the work is placed in the work holding chuck 4 and located therein so that the holes drilled in it will register with the teeth of the cutter in the neutral position. The cutter spindle is brought into axial alinement with the work spindle by movement of its carrying saddle from the displaced position; the cutter being at this time in the neutral position indicated by the detent 46 entering notch 48. Then the machine is set in operation, and continues to operate automatically, reciprocating the cutter spindle and rotating it at the same time, and oscillating the work spindle to relieve the cutter between cutting strokes. When the cutting has progressed in one direction to the prescribed limit, determined by the setting of the stop 49 or 50, the rotary feed of the cutter ceases and the friction driving disks 36 and 37 slip, one on the other, the reciprocation of the cutter continuing. The operator then reverses the machine so that the worm 20 and cutter spindle are rotated in the opposite direction. For this purpose the machine may be provided with any one of a number of reversing means well understood by machine builders and designers, and needless to be shown in detail here. For instance, the drive for the main shaft may be taken from a reversible electric motor, or the main shaft may be provided with two loose pulleys flanking a fast pulley and driven by open and crossed belts from a countershaft, as commonly practised in planers and other machines. This reversal does not change the mode of reciprocation of the cutter in any way because the crank drive for reciprocating it operates the same way when the crank is driven in either direction. After reversal the cutter rotates in the opposite direction, and cuts the opposite sides of the notches in the work with all of its teeth until its rotation is arrested by the other stop, 50 or 49, as the case may be. The operator then stops the entire machine and removes the work. Time may be saved after reversal of the cutter rotation by turning the worm shaft by the handle 45 so as to bring the cutter into operation on the opposite side more quickly than if it were left to be driven by the automatic mechanism. The same reversal also reverses the direction of angular movement given to the work in relieving it, for the cam 63 is then rotated in the opposite direction. This cam has a rise 74 and a drop 75 approximately 180° apart, with a high dwell 76 and a low dwell 77, each extending through nearly 180° of arc, between them. The functions of such cam rise and cam drop are reversed with reversal of the rotation of the cam. In one case relieving motion is caused by the cam, positively; in the other by the spring 69.

The same machine and the same procedure are applicable to produce internal gears adapted to be driven by or to drive a pinion of equal circular pitch but of smaller diameter, forming a gear couple of which the mating teeth enter and withdraw from one another in the course of their rotation. It is effective and particularly useful to cut small internal gears, which are so small that the method of generation by means of a generating shaping cutter is non-feasible or impossible; although in principle it is not limited to any specific size of gear. For the class of work last mentioned the cutter is the same in principle as that already described and operates in the same way. Its teeth are arranged with equal angular spacing to the tooth spaces of the internal gear on a pitch circle of the same diameter as that of the gear, and they have the same forms as the forms to be given the gear tooth spaces, but are narrower in width. In the case of an internal gear of the involute system of gearing the sides of the tooth spaces are involute curves, wherefore the sides of the cutter teeth are generated with the same curves. The curves for any specific internal gear are generated to a base circle determined by known principles from the speed ratio required of the internal gear and pinion couple and the pressure angle of the couple. Hence the tooth faces of the cutter are generated to the same base circle. Then the procedure of forming the internal gear by means of such cutter, after first making a series of holes therein communicating with a central cavity, is carried out in principle exactly as before described with respect to an internal clutch member, and the tooth spaces are cut wide enough to admit the teeth of the mating pinion with such freedom or backlash as may be prescribed.

It will be evident that the function and utility of the machine and method are not limited to forming clutch tooth faces and internal gear teeth which are involute curves only, but that the cutter may be made with teeth conforming to those of other systems of gearing, when provided to cut an internal gear, or with external clutch projections of any form when provided to cut internal clutch or coupling members. In any case, whatever form may be cut in the work, such form is exactly complemental to the cutter; and in the case of an internal clutch is thus complemental to the external clutch member and is adapted to make extended driving contact with the external member. However, the involute form for both gears and clutch members has obvious advantages over other forms owing to the ease and accuracy with which the external clutch members and cutters may be made, and uniformity of tooth face between external clutch member and cutter may be secured. The mode of action performed by the machine results in rapid finishing of the work, whatever may be the number and size of the notches or spaces to be shaped therein, since all are shaped at the same time.

The hereinbefore described machine and method constitute one phase (that of forming internal teeth in a machine element) of a generic invention, the other phase of which (forming the teeth of externally toothed machine elements by similar actions of relative reciprocation and rotation between an externally toothed machine element and a cutter having internal teeth or cutting elements) is disclosed in a subsequent application filed by me September 17, 1929, Serial No. 393,291. The generic invention comprises essentially the provision of a forming cutter with teeth or cutting elements (whether externally or internally arranged) the cutting edges of which are complements or counterparts of the teeth to be formed in the work piece and are spaced correspondingly to the tooth spaces of the work piece; and operating the cutter and work piece relatively to one another in essentially the manner already described. It is my intention to include herein all claims generic to both phases of the invention as well as to all common subject matter disclosed herein and in the above identified later application.

What I claim and desire to secure by Letters Patent is:

1. A machine for forming notches in internal machine elements comprising a cutter having a peripheral series of teeth equal in number and spacing to the notches to be formed, but of less width, and having cutting edges of prescribed form, means for holding said cutter and an internal machine element in axial alinement, and means for effecting a relative axial reciprocation between the cutter and internal machine element and at the same time effecting a relative rotational movement between the cutter and work, whereby the teeth of the cutter are caused to form one side of all of the notches in the work equally and simultaneously.

2. A machine for shaping internal machine elements which comprises a work holder adapted to support a work piece having an annular rim portion and a series of previously formed recesses, narrower than the prescribed width of the tooth spaces to be formed in the work piece and open at the inner periphery of said rim, a cutter having a circular series of teeth spaced and dimensioned to be capable of entering said recesses, said teeth having cutting edges in the intersections of their sides with their end faces and said cutting edges having the form to be given to said tooth spaces, means for holding said cutter in axial alinement with the work piece, means for effecting relative axial reciprocation between the cutter and work piece such that the cutter teeth are caused to enter and withdraw from the said recesses, and means for giving a simultaneous relative rotation between the cutter and work piece such that the cutter teeth are caused to plane off the sides of such recesses during successive axial strokes in one direction.

3. A machine for shaping internal machine elements comprising a work holder adapted to support a work piece having an annular rim portion and a series of previously formed recesses, narrower than the finished width of the tooth spaces to be cut in the work piece and opening through the inner periphery of said rim into the central cavity within the rim, a cutter having a circular series of teeth spaced and dimensioned to be capable of entering said recesses through the open sides thereof from such central cavity, said teeth having cutting edges in the intersections of their sides with their end faces, means for holding said cutter in axial alinement with the axis of the work piece, means for effecting relative axial reciprocation between the cutter and work piece such that the cutter teeth are caused to enter and withdraw from the said recesses, and means for giving a simultaneous relative rotation between the cutter and work piece such that the cutter teeth are caused to plane off one side of all of such recesses simultaneously during successive axial strokes in one direction, said rotation causing means being reversible to effect the cutting action first at one side and then at the opposite side of said recesses.

4. A machine as and for the purpose set forth in claim 2 comprising the means and instrumentalities recited in said claim, together with automatic means for arresting such rotational movement at a predetermined limit.

5. A machine as and for the purpose set forth in claim 3, comprising the means and instrumentalities recited in said claim and automatic means for arresting such rotational movement at predetermined limits in each direction.

6. A machine for shaping internal machine elements comprising a work holder, a cutter spindle axially alined when in operation with the work holder, a cutter mounted on said cutter spindle having laterally projecting teeth, the sides of which are counterparts of the forms to be given the tooth spaces in the work piece but said teeth are narrower than such spaces, means for reciprocating the cutter spindle, means for progressively rotating the cutter spindle in one direction, and independent means for giving a limited oscillation to the work holder between reciprocations of the cutter to relieve the work piece from the cutter during non-cutting strokes thereof.

7. In a machine of the character described, a cutter holder, a work holder, means for effecting relative axial reciprocating movement between said holders for cutting, means for giving one of said holders an independent angular movement for effecting relative cutting feed, and means for giving the other holder a limited angular movement in alternately opposite directions about an axis substantially parallel to the direction of said reciprocating movement, between cutting strokes to relieve the work from the cutter during the non-cutting strokes.

8. A machine for cutting internal machine elements comprising a cutter holder, a work holder, said holders being located in axial alinement for operation, a cutter mounted on the cutter holder and having a series of laterally projecting teeth arranged around the axial line of said holders, means for effecting a relative axial reciprocation between said holders to cause a planing cutting action by the cutter on the work, and means for giving a relative angular movement about the axial line to one of said holders whereby the cutter teeth are caused to plane off one of the bounding sides of all the spaces in the work piece into which such teeth respectively enter.

9. A machine for cutting internal machine elements comprising a cutter holder, a work holder, said holders being located in axial alinement for operation, a cutter mounted on the cutter holder and having a series of laterally projecting teeth arranged around the axial line of said holders, means for effecting a relative axial reciprocation between said holders to cause a planing cutting action by the cutter on the work, means for giving a relative angular movement about the axial line to one of said holders whereby the cutter teeth are caused to plane off the sides bounding the spaces in the work piece into which such teeth respectively enter, and means for moving the other holder angularly after each cutting stroke in the direction and to the extent necessary to clear the cutter from the work in the course of the subsequent noncutting stroke, said means being organized to return the last mentioned holder to operative position before the beginning of the next cutting stroke.

10. In a machine for the purpose set forth, a cutter holder and a work holder, adapted to occupy a position in axial alinement when the machine is in operation, a cutter having a circular series of peripheral endwise cutting teeth secured to said cutter holder, means for reciprocating one of said holders relatively to the other in the line of their alinement, means for simultaneously exerting driving torque upon one of said holders rotatably about their common axis continuously throughout the duration of a number of such reciprocations, said means including a friction clutch adapted to slip under excessive resistance of the rotatable holder, and a stop associated with said rotatable holder for limiting its rotating movement.

11. In a machine for the purpose set forth, a cutter holder and a work holder adapted to occupy a location in axial alinement during operation of the machine, a cutter having a circular series of peripheral endwise cutting teeth secured to said cutter holder, means for reciprocating one of said holders in the line of their alinement, means for simultaneously exerting driving torque upon one of said holders rotatably about their common axis continuously throughout the duration of a number of such reciprocations, said means comprising a worm gear connected with the rotatable holder, a worm meshing with said worm gear, a driver, a friction clutch between said driver and worm for transmitting rotation to the latter and adapted to slip when the worm is arrested, and a stop connected with the worm capable of being set to arrest the rotation of the worm when the rotatable holder has been turned to a predetermined limit.

12. In a shaping machine, the combination of holders for cutter and work, a cutter having radiating teeth with cutting edges at one end, adapted to operate as a planing tool, mounted on the cutter holder, means for effecting relative reciprocation between said holders in the direction of the axis of the cutter, means for rotating one of said holders progressively, the other being normally stationary except for the after mentioned limited oscillation, and means for turning the last mentioned holder about said axis of rotation through an angle in one direction sufficient to clear it of the cutter at the end of each cutting stroke, and to turn it through an equal angle in the opposite direction at the end of each non-cutting stroke.

13. In a shaping machine of the character described having a cutter holder and a work holder, means comprising a rotatable shaft and transmission mechanism driven thereby for effecting relative reciprocating movements between said holders for cutting, and means for giving a limited oscillative movement to one of the holders angularly about an axis located within the circumference of said holder, for relieving the cutter during non-cutting strokes, the last named means comprising a cam mounted on said shaft for rotation thereby in timed relation with the reciprocation causing means; an arm connected with the oscillative holder, intermediate transmission means between said cam and arm, and a spring acting on said arm in opposition to the pressure and resistance of said transmission means.

14. The method of forming an internal toothed machine element which consists in providing a cutter having laterally projecting teeth arranged circularly about its axis in a number and spacing equal to the tooth spaces to be formed in the work but of less width than such spaces, placing the cutter and work piece in axial alinement, and effecting an axial reciprocation between the cutter and work piece, together with a rotation of one relatively to the other about their common axis, in such manner that all the cutter teeth are caused to act simultaneously on the work and form one side of each of the tooth spaces in the work piece by a planing action.

15. The method as set forth in claim 14 and including further the step of reversing such relative rotation and causing the cutter similarly to form the opposite sides of such spaces.

16. The method of forming an internal toothed machine element which consists in providing a circular series of holes in one face of a work piece opening into a common central cavity in the work piece, such holes being narrower than the required finished width of the tooth spaces in the piece, providing a gear-like planing cutter having a circular series of teeth with cutting edges at one end, said teeth having the same pitch as the tooth spaces in the work on a pitch circle of equal diameter, but being sufficiently narrow to extend into said holes from the said central cavity in the work piece, placing the cutter and work piece in axial alinement and effecting a relative axial reciprocation between them of extent sufficient to cause entrance of the cutter teeth endwise into said holes and alternate withdrawal therefrom, at the same time causing a relative rotation about their common axis to take place between the cutter and work piece progressively to a predetermined limit.

17. The method as set forth in claim 16 comprising the step of subsequently effecting a relative rotation between the cutter and work piece in the opposite direction to a predetermined limit; the limits in both directions being sufficiently wide to carry the opposite edges of each cutter tooth beyond the adjacent boundaries of the holes in which the several teeth respectively enter.

18. The method of forming an internal clutch member complemental to an external clutch member which consists in providing a cutter having teeth of less width than the teeth or projections of the mating external clutch member and of similar spacing and outline at their cutting edges, forming holes in the work spaced conformably to the teeth of the external clutch member but of less width than such teeth, and effecting relative axial movement between said cutter and work piece in such fashion that the teeth of the cutter pass endwise into and out of such holes, at the same time producing a relative angular movement between the cutter and work piece such that the cutter teeth are caused to cut away the material of the work piece at one side of each of said holes to a shape which is the counterpart of the sides of the cutter teeth.

19. The method of forming internal clutch members which consists in drilling a circular series of holes in one side of a work piece spaced conformably to the projections of the mating external clutch member but of less width than such projections, counterboring the work piece to form a recess of which the circumference intersects the inner sides of said holes, providing a cutter with teeth equal in number and spacing on the same pitch circle to the projections of the external clutch member but sufficiently narrow in width to enter the holes in the work piece, giving the cutting edges at the sides of the cutter teeth the same outline as the sides of the said external clutch member projections, effecting a relative axial reciprocation between the cutter and work piece such that the cutter teeth are caused to pass endwise into and out of the holes in the work piece, and effecting a relative rotation at the same time between the cutter and work piece until the cutter teeth form one side of the holes in the work piece into counterpart surfaces of the external clutch projections, and then effecting such relative rotation in the opposite direction until the other sides of the cutter teeth form the other sides of the clutch holes into corresponding counterpart surfaces separated from the first surfaces sufficiently to admit the external clutch projections.

20. The method of forming internal clutch members complemental to mating clutch members having external gear teeth as the clutching projections, which comprises generating a gear-like planing cutter with lateral teeth equal in number and spacing on the same pitch circle to the said external clutch teeth but of less width than the latter, and having face curves which are involutes of the same base circle as the clutch tooth faces, providing a work piece with a series of holes in one face of less width than the external clutch teeth, equal in number and spacing on the same pitch circle to said teeth, and with an inner open space having communication with said holes wide enough to admit the cutter teeth, locating the cutter and work piece in axial alinement, effecting such axial reciprocation between the cutter and work piece as will enter and withdraw the cutter teeth into and from the holes in the work piece, at the same time producing a relative rotation between the cutter and work such that the cutter teeth plane away one side of each hole to the form of one side of the external clutch teeth, reversing such rotation, and continuing the reversed rotation simultaneously with said reciprocation until the opposite sides of the holes are cut to the same form as the respectively opposite sides of the external clutch teeth and are separated widely enough from the sides first formed to admit such teeth.

21. In a machine of the character set forth having a cutter holder, a work holder, a cutter secured to said cutter holder and having a circular peripheral series of endwise cutting teeth, a driving shaft at one side of said holders, and mechanism driven by said shaft for reciprocating one of said holders axially of the cutter; means for oscillating one of said holders about an axis within its circumference extending in the direction of such reciprocation for relieving the cutter during noncutting strokes, comprising a cam on the drive shaft, an arm projecting laterally from the last named holder, a lever having a forked arm embracing the first named arm, a cam, a second lever, and transmission rods located respectively between said cam and second lever and between the second lever and the first lever.

22. In a machine of the character set forth having a cutter holder, a work holder, a cutter having a circular series of peripheral endwise cutting teeth secured to said cutter holder, a driving shaft at one side of said holders, and mechanism driven by said shaft for reciprocating one of said holders axially of the cutter; means for oscillating one of said holders about an axis within its circumference extending in the direction of such reciprocation for relieving the cutter during non-cutting strokes, comprising an arm projecting laterally from the last named holder, a lever having a forked arm embracing the first named arm, a cam on the drive shaft, a second lever, transmission rods located respectively between said cam and second lever and between the second lever and the first lever, and a spring arranged to exert force on the first named lever in the opposite direction to the force application transmitted thereto from the cam.

23. A machine for forming simultaneously the tooth faces of a cylindrical toothed machine element comprising a cutter having teeth arranged in circular series on a pitch circle equal to the pitch circle of the machine element and with a spacing on its pitch circle equal to the pitch of the teeth of the machine element, said cutter teeth being narrower than the finished width of the spaces between the teeth of the machine element and having cutting edges in counterpart or complemental form to the prescribed form of the machine element teeth, means for holding the cutter and work piece in axial alinement, and means for effecting a relative axial reciprocation and a relative rotational movement about their common axis, between the cutter and work piece.

24. A machine for simultaneously forming tooth faces upon all of a series of circularly arranged teeth in a machine element, which comprises cutter and work spindles in axial alinement, a cutter secured coaxially to said cutter spindle and provided with teeth arranged in a circular series on a pitch circle and with a spacing thereon equal respectively to the pitch circle and pitch of the teeth to be formed in the machine element, said cutter teeth being narrower than the finished width of the spaces between the teeth of the machine element and having cutting edges in counterpart or complemental form to the prescribed form of the machine element teeth, means for reciprocating one of said spindles relatively to the other, and means for giving a slow rotary movement to one of the spindles progressively in the same direction through a limited distance.

25. A machine for simultaneously forming tooth faces upon all of a series of circularly arranged teeth in a machine element, which comprises cutter and work spindles in axial alinement, a cutter secured coaxially to said cutter spindle and provided with teeth arranged in a circular series on a pitch circle and with a spacing thereon equal respectively to the pitch circle and pitch of the teeth to be formed in the machine element, said cutter teeth being narrower than the finished width of the spaces between the teeth of the machine element and having cutting edges in counterpart or complemental form to the prescribed form of the machine element teeth, means for reciprocating one of said spindles relatively to the other, means for giving to one of the spindles a slow rotary movement progressively in the same direction through a limited distance, and means for oscillating one of said spindles about its axis alternately in opposite directions at the end respectively of the relative cutting and return reciprocations, through a limited distance sufficient to clear the cutter teeth from the work during the return movement.

26. The method of producing circular toothed machine elements which consists in forming a series of recesses intersecting the circular rim of the work piece and equally spaced on a circular pitch line, said recesses being narrower than the prescribed width of the spaces between finished teeth of the machine element, providing a cutter having a circular series of teeth arranged on a pitch circle of the same diameter as the pitch circle of the work piece and spaced equally to the spacing of said recesses, said cutter teeth being complementally arranged to the recesses of the work piece, narrow enough to enter said recesses, and having cutting edges on one end which are counterparts of the prescribed finished tooth forms of the work piece; placing the cutter and work piece in axial alinement, effecting a relative axial reciprocation between the cutter and work piece, and also effecting a progressive rotary feed movement between the cutter and work piece such that the cutter is caused to plane off the stock of the work piece at one side of the several recesses simultaneously.

27. The method of producing circular toothed machine elements which consists in forming a series of recesses intersecting the circular rim of the work piece and equally spaced on a circular pitch line, said recesses being narrower than the prescribed width of the spaces between finished teeth of the machine element, providing a cutter having a circular series of teeth arranged on a pitch circle of the same diameter as the pitch circle of the work piece and spaced equally to the spacing of said recesses, said cutter teeth being complementally arranged to the recesses of the work piece, narrow enough to enter said recesses, and having cutting edges on one end which are counterparts of the prescribed finished tooth forms of the work piece; placing the cutter and work piece in axial alinement, effecting a relative axial reciprocation between the cutter and work piece, and also effecting a progressive rotary feed movement between the cutter and work piece such that the cutter is caused to plane off the stock of the work piece at one side of the several recesses simultaneously, and finally reversing the rotary relative feed movement and thereby causing the cutter teeth to plane off the opposite sides of the recesses.

28. In a shaping machine of the character described comprising a cutter holder, a cutter having a circular series of peripheral endwise cutting teeth secured to said cutter holder, and a work holder; means for effecting relative reciprocating movements axially of said cutter between said holders for cutting, and means for turning one of the holders oscillatively through a small angle about an axis within the circumference of said holder extending in the same direction as the axis of the cutter, for relieving the cutter during non-cutting strokes, the last named means comprising a cam timed with the reciprocation causing means, an arm connected with the oscillative holder, and intermediate transmission means between said cam and arm.

29. A machine for forming the tooth faces of toothed machine elements comprising a cutter having teeth which are rigidly associated in unchanging relationship with one another with a spacing between them equal to that of the intermediate spaces between the teeth of such machine element, and have cutting edges at one end in counterpart or complemental form to the designed tooth faces of such machine element, means for effecting a relative cutting travel lengthwise of the cutter teeth, and means for effecting a relative progressive feed movement transverse to said cutting travel, between the cutter and work piece in such manner that the cutter teeth are caused to plane off, on one side only, a number of teeth of the work piece equally and simultaneously.

EDWARD W. MILLER.